Sept. 29, 1953  G. E. HENNING  2,653,351
APPARATUS FOR ADVANCING AND WORKING ELASTOMER COMPOUNDS
Filed Dec. 12, 1951  2 Sheets-Sheet 1

INVENTOR
G. E. HENNING
BY [signature]
ATTORNEY

Sept. 29, 1953        G. E. HENNING        2,653,351
APPARATUS FOR ADVANCING AND WORKING ELASTOMER COMPOUNDS
Filed Dec. 12, 1951        2 Sheets-Sheet 2
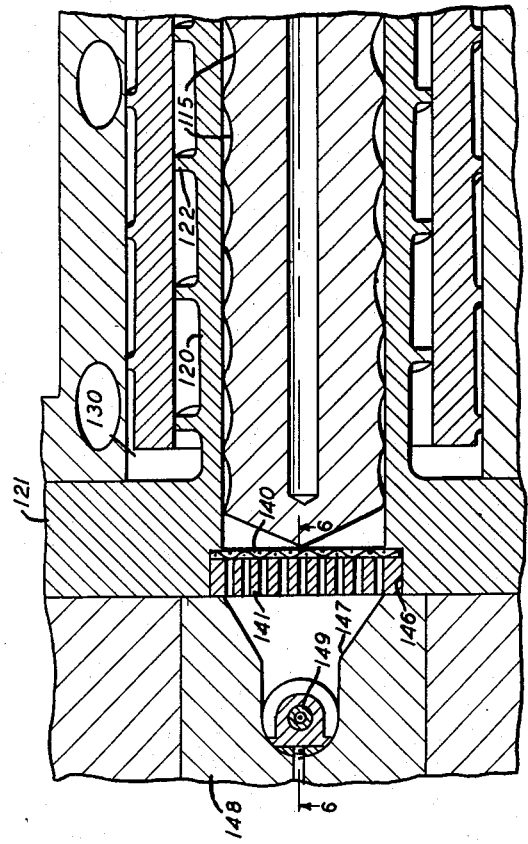
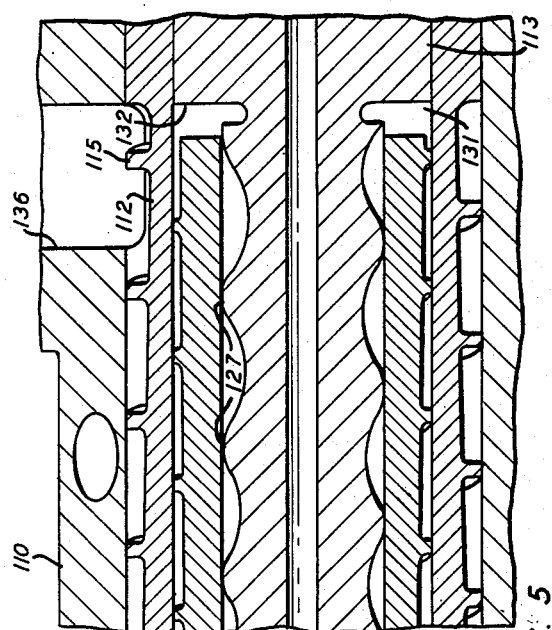
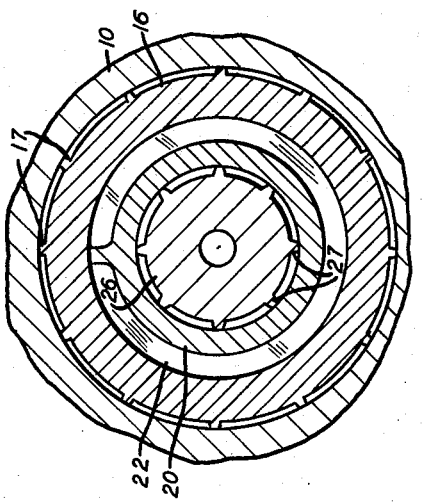
INVENTOR
G. E. HENNING
BY
ATTORNEY Patented Sept. 29, 1953

2,653,351

UNITED STATES PATENT OFFICE 2,653,351

APPARATUS FOR ADVANCING AND WORKING ELASTOMER COMPOUNDS

George E. Henning, Baltimore, Md., assignor to Western Electric Company, Incorporated, New York, N. Y., a corporation of New York Application December 12, 1951, Serial No. 261,299

8 Claims. (Cl. 18—12)

This invention relates to apparatus for advancing and working elastomer compounds, and more particularly to an apparatus for working and extruding insulating and jacketing compounds.

In the manufacture of insulated and jacketed conductors, it has been the practice to enclose elongated conductive cores in coverings of elastomer compounds, such as, for example, vulcanizable compounds including natural rubber, neoprene (polymerized chloroprene), Buna-S (copolymerized styrene and butadiene), and the like, or thermoplastic compounds including polyvinyl chloride, a copolymer of vinyl chloride and vinyl acetate, polyethylene, and the like. In the case of vulcanizable compounds, the common practice has been to break down the compounds prior to introduction thereof into the final extruders, and to have the compounds hot as they are inserted into the extruders so that the extrudability of the compounds is high. However, it is difficult to maintain uniform extruding conditions with such a method, and it has been proposed to achieve only part of the breakdown and mixing prior to introduction of the compound into the final extruder and to provide working elements in that extruder to work the compound and raise it to a temperature such that its extrudability is high. In order to provide a working zone of sufficient length in the extruder, it has been necessary in the past to have a very long extruder, thereby using considerable manufacturing space.

In applying coverings of thermoplastic compounds to conductors, it has been the usual practice to mix all the ingredients of such compounds in suitable mixing equipment and to prepare the compounds for introduction into an extruder in the form of pellets, granules, powders or other particles, or in the form of strips. Such mixing and preparing operations require the use of expensive equipment, and involve the use of numerous operators. It is desirable to provide apparatus in which some or all of the mixing operations may be carried out at the same time that the final compound is being extruded from the apparatus as a covering around a conductor.

An object of the invention is to provide new and improved apparatus for advancing and working elastomer compounds.

Another object of the invention is to provide new and improved apparatus for working and extruding insulating and jacketing compounds.

A further object of the invention is to provide compact extruding apparatus which is capable of working and mixing cold compounds introduced therein to such temperature and plasticity that the extrudability thereof is high.

In an apparatus illustrating certain features of the invention, there may be provided a plurality of stock screws mounted concentrically with respect to one another and in communication with one another so that compound introduced into the apparatus is fed back and forth along the stock screws, and is worked and mixed as it is so fed. Means for forming the compound into article form also may be provided.

A complete understanding of the invention may be obtained from the following detailed description of apparatus forming specific embodiments thereof, when read in conjunction with the appended drawings, in which Fig. 1 is a fragmentary, side elevation of an apparatus forming one embodiment of the invention;

Fig. 3 is a fragmentary, horizontal section taken along line 3—3 of Fig. 2;

Fig. 4 is a fragmentary, vertical section taken along line 4—4 of Fig. 2;

Fig. 5 is a fragmentary, vertical section of an apparatus forming an alternative embodiment of the invention.

Figure 2:
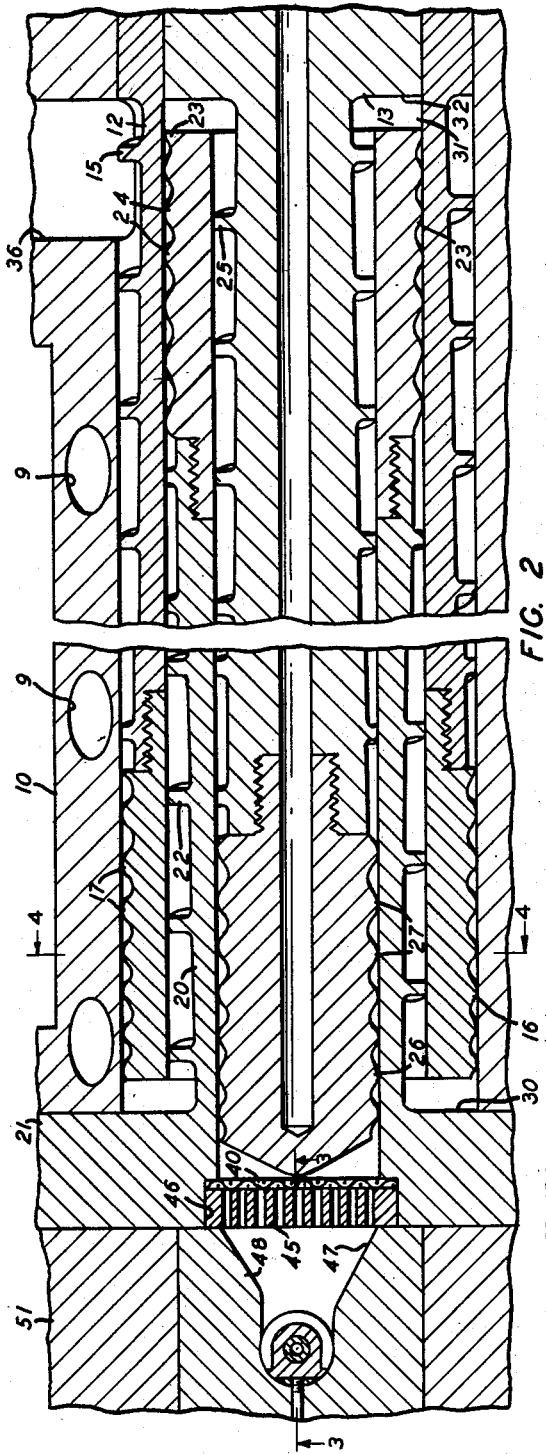
Fig. 2 is an enlarged, fragmentary, longitudinal, vertical section of the apparatus shown in Fig. 1.

Referring now in detail to the drawings, there is shown in Figs. 1, 2, 3 and 4, an extruder which includes an extruding cylinder 10 provided with passages 9—9 therearound through which a suitable heat exchange fluid may be forced to heat or cool the cylinder, as desired. The stock screws 12 and 13 are driven individually at adjustable speeds. The stock screw 12 is tubular, and is provided with a thread 15, which varies from deep at the righthand end thereof, as viewed in Fig. 2, to shallow at the lefthand end thereof. A tapered, tubular stock screw extension 16 having helical, rounded ribs 17—17 is secured to the delivery end of the stock screw 12. The thread 15 of the stock screw 12 fits closely within the cylinder 10.

An intermediate tubular stock screw 20 has a flange 21 fastened to the delivery end of the cylinder 10. The stock screw 20 is provided with a thread 22, which varies from deep at the lefthand end thereof, as viewed in Fig. 2, to shallow at the righthand end thereof, and a tapered, tubular stock screw extension 23 fastened to the stock screw 20 is provided with helical, rounded ribs 24—24 extending therealong. The thread 22 of the stock screw 20 fits closely within the stock screw 12. The stock screw 13 is provided with a thread 25, which fits closely within the stock screw 20, and a tapered stock screw extension 26 provided with helical, rounded ribs 27—27 is secured to the stock screw 13.

The threads of the screws 12 and 13 both spiral in the same direction and the screw 20 spirals in the opposite direction from the right-hand ends of the screws, as viewed in Fig. 2, so that rotation of the screws 12 and 13 advances compound along these screws in one direction and along the screw 20 in the opposite direction. A mixing chamber 30 is provided between the flange 21 and the lefthand end of the extension 16, as viewed in Fig. 2, and a mixing chamber 31 is provided at the righthand end of the stock screw 20, being formed between the end of the stock screw 20 and a shoulder 32 formed on the stock screw 13.

Figure 1:
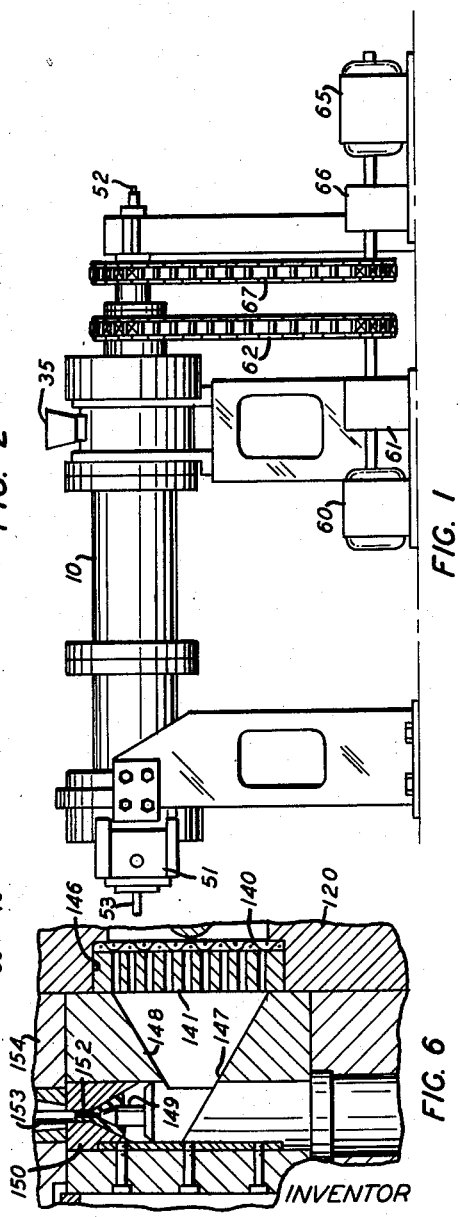
Figure 6:
Fig. 6 is a fragmentary, horizontal section taken along line 6—6 of Fig. 5.

A hopper 35, Fig. 1, is designed to feed compound in pellet, granular, powdered, or strip form through an opening 36 (Fig. 2) in the cylinder 10 to the outer stock screw 12, which together with its extension 16 feeds the material to the mixing chamber 30. The compound then is fed back along the interior of the screw 12 by the stationary screw 20 and its extension 23 to the mixing chamber 31, from which it is fed again to the left, as viewed in Fig. 2, by the stock screw 13 and its extension 26. This forces the compound through a straining screen 40 mounted on a breaker plate 45 positioned in a socket 46 formed in the stationary stock screw 20, through a tapered passage 47 formed in a tool holder 48 around a core tube 49 (Fig. 3) and through a die 50. The die 50, the tool holder 48 and the core tube 49 all are mounted within an extruding head 51 fastened to the stationary stock screw 20 and the cylinder 10. A filamentary conductor 52 is advanced through the core tube 49 and the die 50 by a suitable drive (not shown) and a covering 53 of the compound is formed thereover. The screw 12 is rotated by a motor 60 (Fig. 1) through adjustable gearing in a housing 61 and a sprocket and chain drive 62. The screw 13 extends farther to the right, as viewed in Fig. 1, than does the screw 12, and is driven by a motor 65 through adjustable gearing in a housing 66 and a sprocket and chain drive 67.

*Operation of first embodiment*
*(Figs. 1, 2, 3 and 4)*

The compound is introduced in either mixed or unmixed form into the hopper 35, and is fed along the extruding cylinder 10 to the left, as viewed in Fig. 2, by the stock screw 12 which works, mixes and compacts the compound and expresses air therefrom back through the hopper 35. This working increases in intensity until the extension 16 is reached. The ribs 17—17 severely knead the compound as it is forced therealong into the mixing chamber 30 into which it is forced with a turbulent action.

The compound then is forced along the interior of the stock screw 12 to the mixing chamber 31 by the stationary stock screw 20 and the extension 23 due to rotation of the stock screw 12 relative to the stock screw 20. As the compound is so fed, it is worked with increasing intensity from the lefthand end of the stock screw 20 to the righthand end of the extension 23 from which it is forced with a turbulent action into the mixing chamber 31.

The compound is fed back to the left from the mixing chamber 31 by the stock screw 13, which works it very intensively and delivers it to the extension 26 and forces it along the extension 26. The ribs 27—27 of the extension 26 severely work the compound, which is forced through the straining screen 40 through the breaker plate 45 into and through the extruding head 51, and along the core tube 49 and the die 50, which form the compound into a covering over a core advanced through the core tube and die. The ribs 17—17, 24—24 and 27—27 of the extensions 16, 23 and 26, respectively, divide the compound into a multitude of streams and continuously roll the compound. Thus, very effective mixing and working actions are accomplished.

*Alternate embodiment (Fig. 5)*

There is shown in Fig. 5 an apparatus forming an alternate embodiment of the invention. This apparatus includes an extruding cylinder 110 provided with an opening 136, through which compound may be introduced to an outer stock screw 112 having a thread 115 varying from deep at the entrance end thereof to shallow at the delivery end thereof. The delivery end of the stock screw 112 is located at a mixing chamber 130 formed between a flange 121 on a stationary stock screw 120 and the end of the stock screw 112. The stock screw 120 is provided with a thread 122 varying from deep at the entrance end thereof to shallow at the delivery end thereof.

A stock screw 113 is mounted rotatably within the stock screw 120, and is provided with rounded, longitudinal ribs 127—127. The ribs 127—127 are rounded and are separated by grooves 115—115, which decrease in cross-sectional area from the righthand end of Fig. 5 to the lefthand end thereof. Due to the rotation of the stock screw 112 relative to the stock screw 120, the thread 122 of the stationary stock screw 120 advances compound along the stock screw 120 and progressively compacts the compound as it is forced therealong. The compound advanced by the stock screw 120 enters a mixing chamber 131 formed between the stock screw 120 and a shoulder 132 of the stock screw 113.

The compound is forced from the chamber 131 along the stock screw 113 by the pressure of the stock screws 112 and 120, and is plasticized by the action of the ribs 127—127. The ribs 127—127 preferably have a slight pitch so that they aid somewhat in forcing the compound along the stock screw 113. The compound advances from the stock screw 113 through a straining screen 140 and a breaker plate 141 mounted in a socket 146 formed in the stock screw 120 into a passage 147 formed in a tool holder 148. A core tube 149 and a die 150 are mounted in the tool holder 148, which is positioned in an extruding head 154 secured to the stationary stock screw 120 and the cylinder 110. A filamentary conductor 152 is advanced through the core tube 149 and the die 150, and a covering 153 composed of the compound is formed on the conductor.

*Operation of alternate embodiment (Fig. 5)*

The compound is introduced cold in strip, pelletized, powdered or granular form with the ingredients thereof either mixed or unmixed, and is forced along the cylinder 110 by the stock screw 112. As the compound is so advanced, it is thoroughly worked, mixed and compacted with increasing intensity from the entrance end of the screw 112 to the delivery end thereof, from which it is forced into the mixing chamber 130, wherein turbulent action and rotation of the stock screw 112 not only feeds the compound along the thread 115 but also feeds the compound back to the right along the thread 122, which again progressively compacts and works the compound and delivers it into the mixing chamber 131 with a turbulent action. The ribs 127—127 and the back pressure on the compound force the compound to the left along the interior of the stationary screw 120, and severely and progressively knead and work the compound, which then is forced through the straining screen 140 and the breaker plate 141, and is extruded into article form.

The above-described apparatus provides long lengths of travel for the compounds so that the compounds are thoroughly mixed and worked as they are advanced along those paths while the apparatus is short and compact in construction. The outer stock screws and the inner stock screws may be rotated at the same or different speeds so that the delivery action of each may be varied as desired to effect numerous compound-working conditions without any change in structure of the apparatus. Thus, the apparatus are highly flexible in their operation to provide optimum extruding conditions for different types of compounds having a wide range of requirements for optimum extrusion conditions.

The above-described apparatus are particularly well suited to mix ingredients, such as, for example, to mix carbon black in polyethylene, and extrude the resulting mixture continuously into coverings over cores, such as conductors, cables and the like. The apparatus may also be used to extrude compounds continuously into other products. For example, the apparatus very successfully extrudes rods, tubes and other types of articles.

It is to be understood that the extruding cylinders, the several screws mounted therein and the extruding head all may be provided with heat exchange passages through which a suitable heat exchange fluid may be circulated to heat or cool these elements individually as may be required.

Certain features of the above-described apparatus are disclosed and claimed in A. N. Gray Patent 2,547,000, granted April 3, 1951, and in copending applications Serial No. 86,085, filed April 7, 1949, by G. E. Gliss, Serial No. 86,086, filed April 7, 1949, by G. E. Gliss and A. N. Gray, and Serial No. 261,275, filed December 12, 1951, by A. N. Gray.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An extruder, which comprises an extruding cylinder having a bore having an entrance end and a delivery end and also provided with a feed opening positioned at the entrance end of the bore, a tubular stock screw mounted rotatably in the bore for feeding compound from the feeding opening to the delivery end of the bore, a second tubular stock screw extending into the first-mentioned stock screw from the delivery end of the first-mentioned stock screw toward the entrance end thereof and being fixed against rotation relative to the cylinder for feeding compound along the interior of the first-mentioned screw from the delivery end of the bore toward the entrance end thereof, means forming a mixing chamber at the delivery end of the first-mentioned screw, a third stock screw rotatably mounted in the second-mentioned screw for forcing compound along the interior of the second-mentioned screw toward the delivery end of the bore, means forming a mixing chamber at the delivery end of the second-mentioned screw, and an extruding head mounted at the delivery end of the bore, at least one of the stock screws being provided with compound-working ribs extending along a portion thereof.

2. An extruder, which comprises an extruding cylinder having a bore having an entrance end and a delivery end and also provided with a feed opening positioned at the entrance end of the bore, a tubular stock screw mounted rotatably in the bore for feeding compound from the feed opening to the delivery end of the bore, said screw being provided with a threaded portion and a portion having rounded ribs, a second tubular stock screw extending into the first-mentioned stock screw from the delivery end of the first-mentioned stock screw toward the entrance end thereof and being fixed against rotation relative to the cylinder for feeding compound along the interior of the first-mentioned screw from the delivery end of the bore toward the entrance end thereof, said second-mentioned screw being provided with a threaded portion and a portion having rounded ribs, means forming a mixing chamber at the delivery end of the first-mentioned screw, a third stock screw rotatably mounted in the second-mentioned screw for forcing compound along the interior of the second-mentioned screw toward the delivery end of the bore, said third-mentioned screw being provided with a threaded portion and a portion having rounded ribs, means forming a mixing chamber at the delivery end of the second-mentioned screw, and an extruding head mounted at the delivery end of the bore.

3. An extruder, which comprises an extruding cylinder having a bore having an entrance end and a delivery end and also provided with a feed opening positioned at the entrance end of the bore, a tubular stock screw having a tapered root mounted rotatably in the bore for feeding compound from the feed opening to the delivery end of the bore, a second tubular stock screw having a tapered root extending in the first-mentioned stock screw from the delivery end of the first-mentioned stock screw toward the entrance end thereof and being fixed against rotation relative to the cylinder for feeding compound along the interior of the first-mentioned screw from the delivery end of the bore toward the entrance end thereof, means forming a mixing chamber at the delivery end of the first-mentioned screw, a third stock screw having rounded ribs extending therealong and being tapered, said third-mentioned screw being rotatably mounted in the second-mentioned screw for forcing compound along the interior of the second-mentioned screw toward the delivery end of the bore, means forming a mixing chamber at the delivery end of the second-mentioned screw, and an extruding head mounted at the delivery end of the bore.

4. An apparatus for advancing and working elastomer compounds, which comprises an extruding cylinder having a bore therein extending from the entrance end thereof to the delivery end thereof, a tubular stock screw mounted rotatably in the bore in the extruding cylinder and extending to a point short of the delivery end of the cylinder, said screw having a thread extending in a direction such as to advance compound from the end of the bore toward the delivery end thereof when rotated in a predetermined direction, a second tubular stock screw fitting closely within the first-mentioned stock screw and provided with an external shoulder closing the delivery end of the extruding cylinder to form with the first-mentioned stock screw a mixing chamber, said second-mentioned stock screw being fixed against rotation relative to the cylinder and being provided with a thread that propels compound from the delivery end of the cylinder along the interior of the first-mentioned stock screw toward the entrance end of the cylinder as the first-mentioned screw is rotated in said direction, a third stock screw fitting into the second-mentioned stock screw and rotatable in the second-mentioned stock screw for advancing compound from the delivery end of the second stock screw long the interior of the second stock screw toward the delivery end of the extruding cylinder, one of said first-mentioned screws and said third-mentioned stock screw being provided with a shoulder at the entrance end thereof and spaced from the delivery end of the second-mentioned stock screw to form a mixing chamber therewith.

5. An apparatus for advancing and working elastomer compounds, which comprises an extruding cylinder having a bore therein extending from the entrance end thereof to the delivery end thereof, a tubular stock screw mounted rotatably in the bore in the extruding cylinder and extending to a point short of the delivery end of the cylinder, a second tubular stock screw fitting closely within the first-mentioned stock screw and provided with an external shoulder closing the delivery end of the extruding cylinder to form with the first-mentioned stock screw a mixing chamber, said second-mentioned stock screw being provided with a thread that propels compound from the delivery end of the cylinder along the interior of the first-mentioned stock screw toward the entrance end of the cylinder, a third stock screw fitting into the second-mentioned stock screw and rotatable in the second-mentioned stock screw for advancing compound from the delivery end of the second stock screw along the interior of the second stock screw toward the delivery end of the extruding cylinder, said third-mentioned stock screw being provided with an external shoulder at the entrance end thereof and spaced from the delivery end of the second-mentioned stock screw to form a mixing chamber therewith.

6. An extruder, which comprises an extruding cylinder having a bore extending longitudinally therethrough, a first stock screw mounted rotatably in the bore and extending from one end substantially to the other end of the bore, said first stock screw being provided with a coextensive interior bore and a helical thread for advancing an elastomer compound through the cylinder when the first stock screw is rotated, and a second stock screw extending axially through the interior of the first stock screw and having a helical thread for receiving the elastomer compound from the first stock screw and advancing the compound in the opposite direction for that in which it is advanced by the first stock screw.

7. An extruder, which comprises an extruding cylinder having a bore extending therethrough, a stock screw mounted rotatably in the bore in the extruding cylinder and extending from one end of the bore substantially to the other end of the bore and provided with a thread extending therearound in a direction such that the material is fed from said first-mentioned end of the bore toward the second-mentioned end of the bore as the screw is rotated in a predetermined direction, a second stock screw provided with a thread extending therearound in a direction such that compound is advanced therealong in a direction opposite to that in which the compound is advanced along the first-mentioned stock screw, and means at the second-mentioned end of the extruding cylinder forming a mixing chamber with the delivery end of the first-mentioned screw.

8. An extruder, which comprises an extruding cylinder having an extruding bore therein and also provided with a feed opening near the entrance end of the bore, a tubular stock screw rotatable in the bore and extending from the feed opening substantially to but spaced from the delivery end of the bore, a second tubular stock screw provided with a flange thereon mounted in the first-mentioned stock screw in a position in which the flange abuts the delivery end of the extruding cylinder and the delivery end of the second-mentioned stock screw extends substantially to the entrance end of the bore, said second-mentioned stock screw being fixed against rotation relative to the cylinder, the thread on the first-mentioned stock screw and the thread on the second-mentioned stock screw extending in opposite directions from the delivery ends of each so that rotation of the first-mentioned stock screw advances compound along the screws in opposite directions.

GEORGE E. HENNING.

References Cited in the file of this patent

UNITED STATES PATENTS

| Number | Name | Date |
| --- | --- | --- |
| 1,516,841 | Buttfield | Nov. 25, 1924 |
| 1,978,163 | Megow | Oct. 23, 1934 |